UNITED STATES PATENT OFFICE.

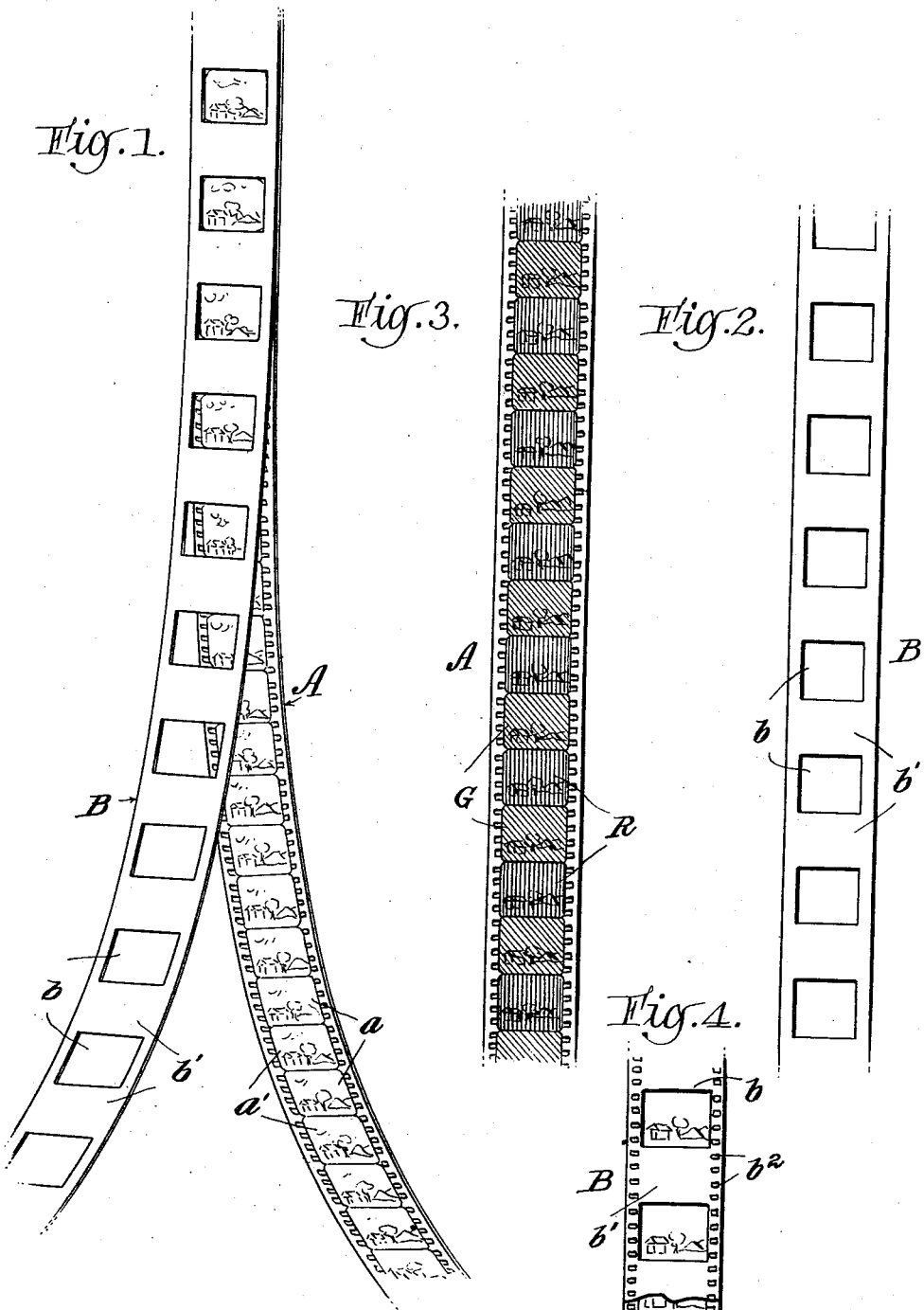

JOSEPH SHAW AND JOHN W. BERWICK, OF NEW YORK, N. Y., ASSIGNORS TO RAINBOW PICTURES CORPORATION, A CORPORATION OF NEW YORK.

COLOR MOVING PICTURES.

1,287,594.

Specification of Letters Patent.

Patented Dec. 10, 1918.

Application filed July 18, 1917. Serial No. 181,279.

*To all whom it may concern:*

Be it known that we, JOSEPH SHAW, a citizen of the United States, and JOHN W. BERWICK, a subject of the King of Great Britain, both residents of the city of New York, borough of the Bronx, in the county of the Bronx and State of New York, have invented new and Improved Color Moving Pictures, of which the following is a full, clear, and exact description.

Our invention relates in general to the production of moving pictures in colors and particularly to a simple method of obtaining moving pictures in colors in the standard moving picture projector without the use of any recurring color filters in projection.

Our invention consists in the taking on a panchromatic negative film, picture image sections representing successive aspects of a scene in consecutive relation in the ordinary step-by-step movement of the film in a standard camera equipped as it is being regularly used with only one lens means and movable primary color filters in front or back of the lens, each picture section registering a color selection of one of the said filters, the printing of a positive film from this negative film in the regular way, and a process or method of tinting the gelatin of the film of each picture image section to colors suitable to or corresponding to their color selection for the purpose of projecting motion pictures in colors through the standard projector without the necessity of using any separate color filters to color the picture image section of the positive film on projection.

As far as we are aware, no one else has as yet suggested a method for tinting a moving picture film which, as disclosed by us below, consists in taking negative picture image sections in the manner described above and when a positive film is made therefrom in the regular way and using it in combination with specially provided means for this purpose to enable one skilled in the art to immerse the entire positive film into baths of dye solutions of different colors to selectively and alternately color certain picture image section areas showing color separation, to a color or tint each suitable to the color selection of the picture image section.

Some workmen in the art have endeavored to achieve results in coloring the film by the use of stencils and airbrush or have suggested to obtain the coloring by saturating ribbons with colors and imparting its colors to the positive film by inhibition but these methods are impracticable, tedious, time-consuming and too costly to be commercially employed. Besides it is very difficult to control the coloring in these ways and hence it is desirable to provide means by which results can be obtained more quickly and at a reasonable cost.

In the art of making color screen mattresses for use in the manufacture of color plates in connection with a coating of bromid emulsion, resinous or fatty substances have been employed as a waterproof resist to obtain different colors; in other similar methods, waterproof substances were suggested to facilitate the manufacture of color plates, whereas in the production of moving pictures in colors there are no means to enable one skilled in the art to readily and surely tint the positive picture image sections to differently desired colors on a commercial and practical basis.

This has been accomplished by our present improvement. We have found that a rubber solution applied to the emulsion surface of a positive film makes a satisfactory waterproof resist. We make this rubber solution to a suitable consistency and spread it thinly on a cloth support which is prepared in a continuous roll and is about the width of the film, this cloth support having spaced openings of the size of a standard picture area alternating with blank or opaque sections of a size to cover one or more picture image areas.

By bringing together the rubber-coated side of the cloth support and the gelatin face of the positive film, starting at one end, the film and support are readily adjusted, the support adhering to the entire film length, thus alternately protecting picture image areas of the film to resist liquid influence and leaving unprotected intermediate picture areas.

By this method of water-proofing, the entire film can be immersed in a dye solution, the unprotected picture image sections only absorbing the dye. After fixing the dye and drying the film the waterproofing resist is removed and the colored picture image section areas can be waterproofed in a similar manner and the entire film immersed in a dye of a different color, the previously protected section now absorbing this color. After fixing the last dye and drying the film the waterproof resist is removed, the entire length of the film now showing the picture image areas in different tints in alternate or intermediate relation to each other.

Although any number of different colors can be thus obtained by the alternate use of the rubber support, we prefer, in our method forming the substance of this patent, to dye the positive film bearing color selected picture image sections into two colors, viz: green and red, by immersing the film, to which surface the waterproof resist has been applied, selecting as we prefer to first waterproof the areas of the picture image sections showing red color selection, in a green dye solution, the unprotected picture image sections absorbing the green dye. It usually takes from one to four minutes according to the dye and its consistency. When the desired depth of color is obtained, the film is rinsed in water to remove the surplus color and is fixed to prevent the film from bleeding. The film is dried and the waterproof resist is removed showing one half the picture image sections in a green color and the balance in black and white, in alternate relation to each other.

We then again apply the waterproof support to the surface of the film, this time protecting the already colored portions of the film, and immerse the entire film in a bath of red dye, rinsing the film, fixing the dye, drying the film and removing the support.

At this stage the picture image areas of the film show tints of red and green in alternate relation to each other and suitable to their color selection, and the film is ready to be projected in a regular standard projector without having to use primary color filters in projection.

Continuing our experiments in the direction of simplifying the methods of tinting we have found that by immersing the film immediately after the first bath of green dye in a solution of tannic acid the gelatin area of the green dye images hardens to such an extent that these areas will not take any of the next used and following red dye solution. There is quite a variety of chemicals to harden the gelatin, but we prefer to use tannic acid. Thus the gelatin of the green colored picture image section areas is rendered hard and will not absorb the next following red dye solution if immersed for a brief time. This obviates the necessity of applying the waterproof resist a second time, thus reducing the time, labor and cost considerably.

It is obvious that, instead of using a single waterproof support to protect the entire film length as described, one might, without exceeding the scope of our invention, make use of separate supports of the size of a picture image area, which supports can be applied individually for the purpose of protecting alternate picture image sections as herein disclosed. Or other resinous substances in solutions can be made up to a proper consistency and have adhesive properties and can be spread on supports for use in tinting the positive moving picture film in a manner disclosed by us.

We wish to state that we are not limiting ourselves to any particular dyes for tinting the films, as there are quite a number of different anilin, basic dyes or color lakes that will readily and uniformly stain the gelatin of the film. In practice we find aqueous dye solutions answer our purpose, affecting the gelatin readily and quickly, but alcoholic dye solutions may be also employed.

By our improved method the provided means for water-proofing the films for selective coloring of the picture image areas, not only has the advantage of manufacturing a positive film which can be distributed and used in the regular standard moving picture projector in all the moving picture theaters, but also lends itself to the production of more natural shades of colors of the varied subjects, by our being able to vary the tints and densities of the green and red colored picture image section areas, governing it, as the particular colors of the various subjects or scenes would require. This cannot be commercially and satisfactorily accomplished with the methods employing recurring projecting color filters. We have found in practice that a set of color projecting filters is not always entirely satisfactory for showing colors from films of various scenes; of course, the color filters could be changed but it is not feasible nor practicable to leave it to the operator of the moving picture theater to change or adjust the color filters; whereas by our improved method the finished tinted film ready for the market will have tints of the required density to produce satisfactory results in colors for each subject or scene.

In the accompanying drawings, which illustrate one embodiment of the invention and wherein similar characters of reference indicate corresponding parts in all the views, Figure 1 is a perspective view of a portion of a positive film with the waterproof resist or cover partially applied thereto;

Fig. 2 is a fragmentary view of a portion of the resist cover or blanket detached;

Fig. 3 is a plan view of a portion of the finished positive film; and

Fig. 4 is a fragmentary view showing a slight modification in the waterproof resist or cover.

Referring to the drawing, A designates a positive moving picture film printed from a negative made by the aid of a color screen having primary color filter sections through which color separated picture image sections are taken. In tinting the film A a waterproof resist, cover or blanket B is employed. This comprises a strip of cloth or other support which has spaced openings $b$ equal in size to a picture section, and in a case where it is desired to tint alternate sections $a$, $a'$ of the film A, green and red respectively, the openings $b$ are separated by a blank area $b'$, also equal in size to a picture image section of the film A. The under surface of the element B is covered with a solution of rubber or equivalent material, so that the element B can be caused to adhere to the film. The film and waterproof cover are so applied that the openings $b$ will register with one set or group of picture images and the blank portion $b'$ will register with the other set or group of image sections. The waterproof cover B can be of the same width as the film, as shown in Fig. 1, and be devoid of perforations for the gear wheels, or it may be provided with perforations $b^2$ along its edges to register with the perforations of the film, as shown in Fig. 4. The method of utilizing the waterproof resist or cover B has been fully explained, and by its use the positive film resulting therefrom will have alternate sections tinted red and green, as indicated by the differently shaded image picture sections, as shown in Fig. 3, these sections being designated red and green, respectively, by the reference characters R and G. It will be understood, however, that more than two colors may be employed, and in this case the waterproof resist or cover will have the openings farther apart so that more than one set of picture image sections will be blanketed at a time and protected from the effect of the tinting dye utilized for tinting the uncovered or exposed picture image sections.

Having thus described our invention, we claim as new and desire to secure by Letters Patent:

1. The method of tinting into different colors a moving picture positive film bearing color separated picture image sections to be used for projection of moving pictures in colors in a regular standard moving picture projector without the aid of any color filters, substantially as described, consisting in producing a moving picture positive film which has been printed from a moving picture negative film bearing groups of two or more color separated picture image sections taken in a standard moving picture taking camera equipped with one lens means, with the aid of color filters in front or back of the lens, by tinting into different primary colors one of the tinting steps consisting in bringing a waterproof rubber resist, attached to a cloth support in a continuous roll, having alternate openings of the size of a standard moving picture image area, into contact with the gelatin face of the film, then immersing the entire length of the film and support into a dye solution of one color, suitable to the color selection of the picture image sections of the unprotected picture areas of the film, until the desired depth or tint of color is obtained, and drying the film.

2. The method of tinting into different colors a moving picture positive film bearing color separated picture image sections to be used for projection of moving pictures in colors in a regular standard moving picture projector without the aid of any color filters, substantially as described, consisting in producing a moving picture positive film which has been printed from a moving picture negative film bearing groups of two or more color separated picture image sections taken in a standard moving picture taking camera equipped with one lens means, with the aid of color filters in front or back of the lens, by tinting into different primary colors, by the following steps, viz: bringing a waterproof rubber resist, attached to a cloth support in a continuous roll, having alternate openings of the size of a standard moving picture image area into contact with the gelatin face of the film, then immersing the entire length of the film and support into a dye solution of one color, suitable to the color selection of the picture image sections of the unprotected picture areas of the film, until the desired depth or tint of color is obtained, hardening the gelatin in a solution of tannic acid, rinsing and drying the film, removing the waterproof support, immersing the entire film for a brief time in a dye solution of different color from the first to tint the formerly protected image areas, and finally drying the film.

3. The process of tinting a positive moving picture film bearing color separated picture image sections printed from a moving picture negative film taken with a standard moving picture taking camera equipped with one lens, with the aid of recurring color filters in front or back of the lens, into two primary colors, viz: red and green, said positive film to be used for projection of moving pictures in colors in a regular standard projector without having to use any color filters in projection; which process consists in bringing into adhesive contact with the gelatin side of the positive film a waterproof rubber resist, attached to a continuous cloth support having alternate openings of the size of a standard moving picture area, the support being so adjusted as to protect or waterproof the picture image areas of the red color separation, immersing the entire length of the film into a green dye solution for a brief period to color the unprotected picture image areas to a desired depth of green color, hardening the gelatin in a solution of tannic acid, rinsing and drying the film, removing the waterproof support and again immersing the entire film for a brief time into a red dye solution without having to waterproof the green colored picture image areas while the previously protected and untinted picture image areas of red color separation absorb the red dye solution, the previously green colored image areas not being affected by any of the red dye solution, and finally drying the film, whereby the latter will have red and green colored picture areas in alternate relation to each other.

4. The step in tinting into different colors standard moving picture films having picture image sections of different color selection, consisting in bringing into contact with the gelatin side of the film a waterproof resist having spaced openings each of a size corresponding to a picture image area, and each opening registering with such area while the portions of the resist between the openings completely cover and protect the remaining portions of the film, and immersing the film and resist in a dye solution to dye only those portions of the film exposed through the openings suitable to the color selection of such exposed picture image areas.

5. The step in tinting into different colors standard moving picture positive films having picture image sections of different color selection, by bringing a waterproof rubber resist attached to a cloth support in a continuous roll having alternate openings of the size of a standard moving picture image area, into contact with the gelatin side of the picture image areas of one color selection and immersing the entire length of the film and support into a dye solution suitable to the color selections of the unprotected picture image sections.

JOSEPH SHAW.
JOHN W. BERWICK.